April 30, 1935. L. J. CLAYTON 1,999,751
MEANS FOR CONTINUOUS VULCANIZATION OF RUBBER GOODS
Filed May 8, 1933 2 Sheets-Sheet 1
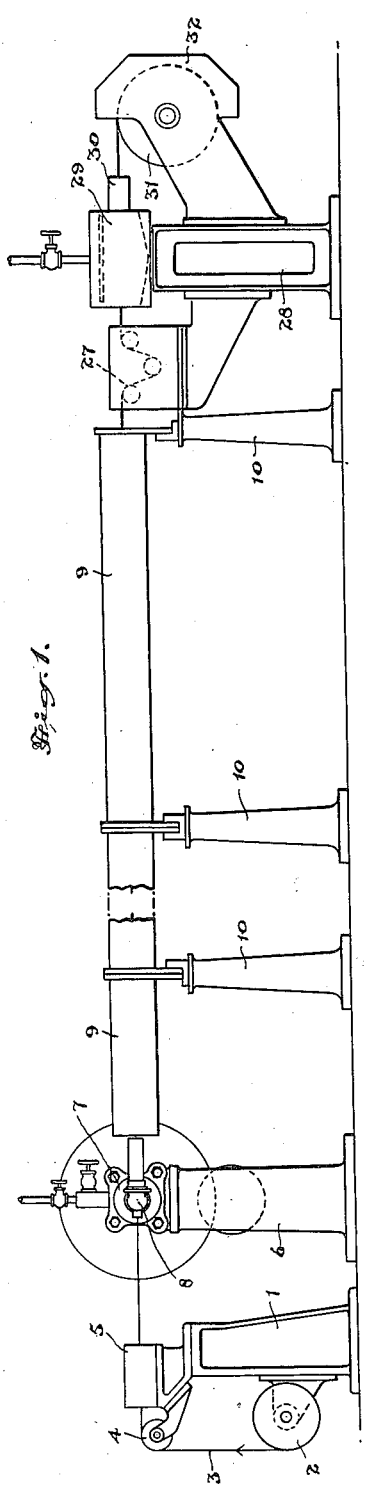
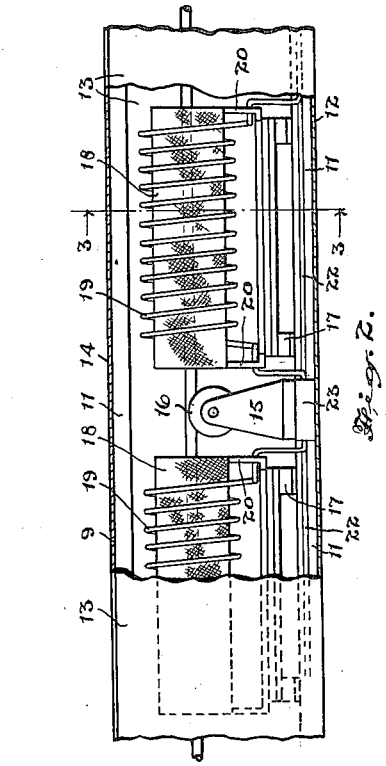
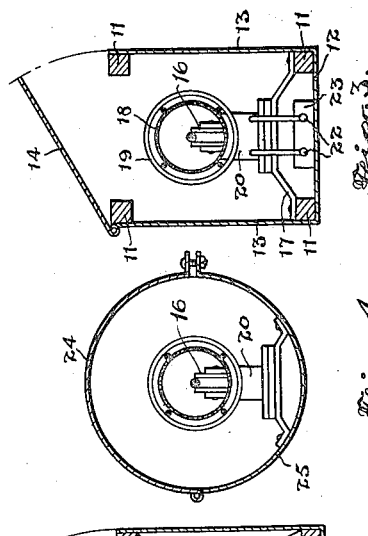
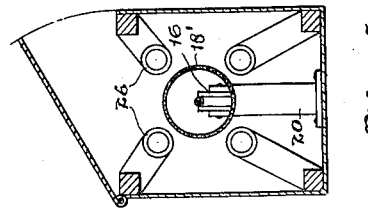
Inventor.
Lewis J. Clayton.

April 30, 1935.  L. J. CLAYTON  1,999,751
MEANS FOR CONTINUOUS VULCANIZATION OF RUBBER GOODS
Filed May 8, 1933  2 Sheets-Sheet 2
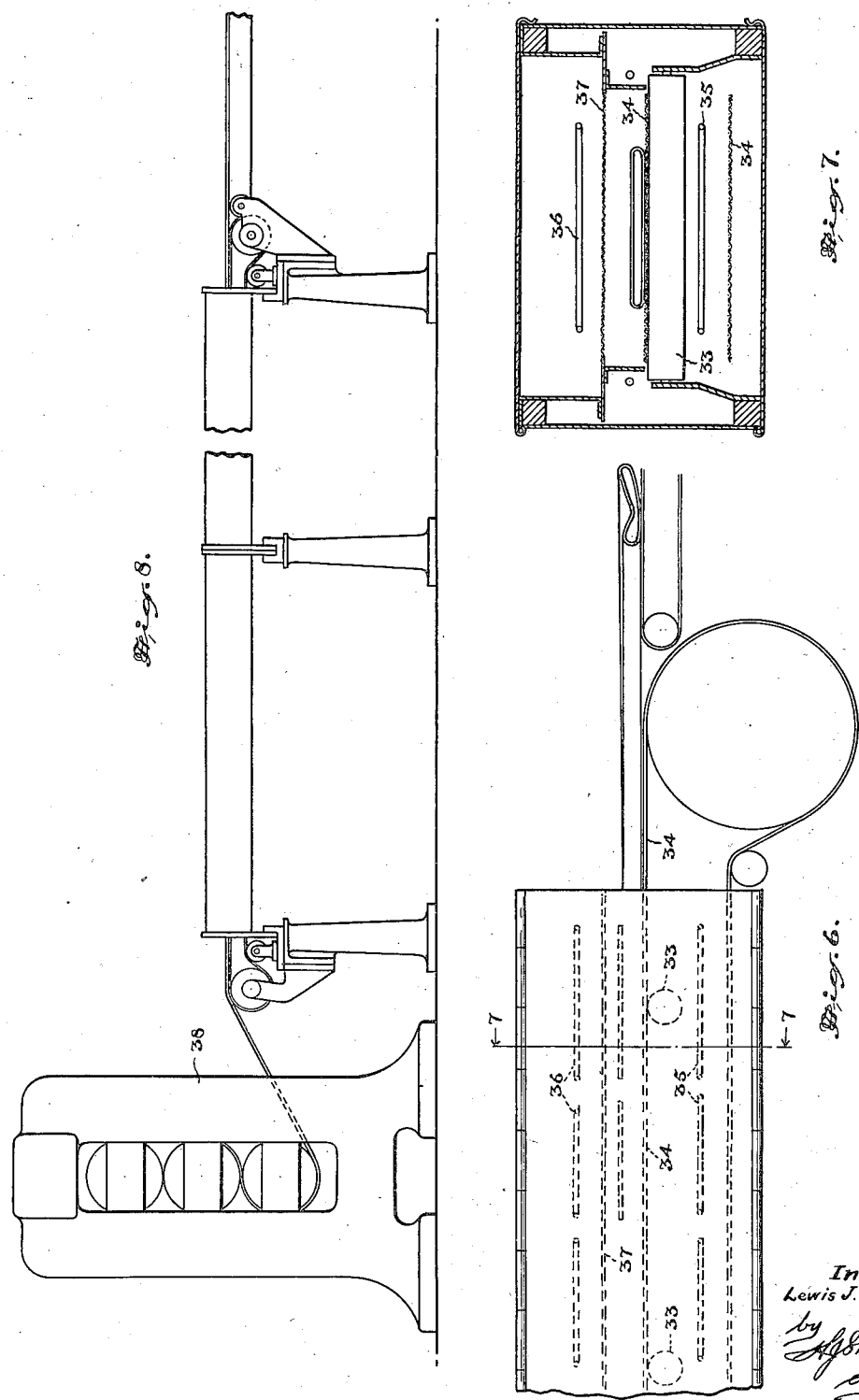
Inventor.
Lewis J. Clayton.

Patented Apr. 30, 1935

1,999,751

UNITED STATES PATENT OFFICE 1,999,751

MEANS FOR CONTINUOUS VULCANIZATION OF RUBBER GOODS

Lewis J. Clayton, Toronto, Ontario, Canada, assignor to Viceroy Manufacturing Company, Limited, Toronto, Ontario, Canada Application May 8, 1933, Serial No. 669,828

10 Claims. (Cl. 18—6)

The principal objects of this invention are to enable the effective vulcanization of rubber goods of indefinite length in a continuous process which will be highly economical and which may be accurately regulated to suit the requirements of products of varying size and shape.

A further and important object is to conserve the heat first applied to the rubber in forming it to shape in mill, calender, or extruding machine by passing the goods directly from the former into the vulcanizing zone.

A still further object is to preserve the formation of the goods throughout the process and to avoid discoloration.

The principal features of the invention consist in passing the "formed" goods through a zone in which regulated radiant heat is directed against the rubber material to raise its temperature to the required point and to maintain such heat for the necessary period to effect vulcanization, the heaters and the goods in passage being enclosed within a chamber or tunnel having heat-reflecting walls.

In the accompanying drawings, Figure 1 is an elevational view of a machine particularly adapted for the manufacture of rubber insulated wire.

Figure 2 is an enlarged, part sectional elevation of a portion of the vulcanizing tunnel and heaters arranged therein.

Figure 3 is a cross section through the vulcanizing tunnel on the line 3—3 of Figure 2.

Figure 4 is a cross sectional view of a modified form of tunnel.

Figure 5 is a cross sectional view of a further modified form of tunnel.

Figure 6 is a diagrammatic elevation of a portion of a form of tunnel particularly adapted for vulcanizing flat or tubular rubber strips.

Figure 7 is a cross section of the tunnel shown in Figure 6 taken on the line 7—7.

Figure 8 is a side elevational view showing my improved vulcanizing device arranged in direct association with a calender.

A method for effecting the continuous vulcanization of rubber goods is more directly applicable to the manufacture of insulated wire, but it will be readily understood that many different forms of rubber goods which may be produced in indefinite lengths may be handled with economy by a process which enables a continuous treatment and therefore constant production.

It has been the custom in applying the rubber insulation to wire to feed the rubber compound into a tubing machine which extrudes it around the wire, and the wire with its unvulcanized covering emanating from the delivery side of the machine has been coiled in pans or wound on large steel drums and later introduced into vulcanizing ovens.

Such methods of handling are slow and cumbersome and are necessarily expensive and it has been proposed to conduct the wire covered with unvulcanized rubber from the tubing machine where the compound is extruded upon it into a steam vulcanizing tube and the rubber compound is secured onto the wire in a continuous operation.

The use of steam in such a manner involves numerous difficulties in maintaining the proper temperatures and in sealing the steam jacket where the wire enters and leaves the vulcanizing chamber.

The present invention proposes a novel manner of applying the necessary heat to effect the vulcanization of the rubber which will obviate the difficulty hitherto encountered.

In carrying the present invention into effect in the vulcanizing of the rubber insulation of wire, the general arrangement of the plant is illustrated in Figure 1 of the drawings.

In the form of the device illustrated in Figure 1, a standard 1 has mounted on one side thereof a wire reel 2 from which the wire 3 extends upwardly over a guide roller 4 and is directed horizontally through a drying chamber 5 mounted on the top of the standard and provided with suitable heating equipment, preferably radiant electric elements.

Mounted adjacent to the standard 1 is a standard 6 upon which is mounted a rubber extruding or tubing apparatus 7 which forces the rubber material to flow around the wire 3 as it passes through the head 8.

Arranged adjacent to and in alignment with the insulating head 8 is a tubular casing 9 which is supported on a plurality of standards 10. The casing 9 is a very simple form of structure illustrated in Figures 2 and 3 in the form of a plurality of longitudinal bars 11 arranged in a rectangular disposition and secured to the bottom and side plates 12 and 13, the top being closed by a plate 14 which may or may not be hinged as shown.

Each of the plates 12, 13 and 14 are made of thin sheet metal and are preferably highly polished both inside and out so that they will reflect heat rays.

Mounted in the tubular casing 9 at suitable intervals are brackets 15 which carry the grooved rollers 16 which are adapted to support the rubber-covered wire, the casing 9 being arranged in alignment with the insulating head of the tubing device so that the rubber-covered wire will extend longitudinally through the casing substantially centrally thereof.

Arranged within the casing 9 and supported on suitable brackets 17 intermediately between the rollers 16, are the cylindrical screens 18. These are supported longitudinally of the casing with their axes in alignment with the insulated wire carried by the rollers 16. They are formed of a fairly fine mesh and the wires thereof are of a black finish for a purpose which will hereinafter appear.

Surrounding the cylindrical screens 18 and suitably spaced therefrom are the electrical radiant heating units 19. These are preferably in helical form and are supported from suitable insulating mounts 20 carried on brackets 17 extending transversely of the casing. These heaters are electrically connected with the bus wires 22 which extend lengthwise of the casing preferably supported in insulators 23.

The heaters 19 which are coiled around the cylindrical screens 18 produce waves of radiant heat which, travelling inward, are diffused by the fine wire mesh screen so as to be spread uniformly and to apply the heat waves emanating from the heaters to the rubber-covered wire 3 moving centrally through the heated area. The radiant heat waves which are directed outwardly by the heaters 19, strike the highly polished inner wall of the casing 9 and are reflected back to be absorbed by the screens 18 and to assist in the distribution of the produced heat in the central area.

These heaters may be spaced apart any desirable distance and the distances may vary so that the heat may be applied gradully to bring a wire up to the required temperature in its course of travel through the tubular casing or heating tunnel.

It will be readily understood that the heaters may be brought to a maximum condition of heat to be generated within the vulcanizing chamber and an arrangement of such heaters may be provided to maintain the maximum heat required for treating the rubber-covered wire for the required distance to ensure the proper vulcanization of the rubber without it being harmfully overheated.

It is not thought necessary to show any special form of apparatus for controlling the heat of the heaters 19, but it will be readily appreciated that these may be controlled separately and their heat may be controlled individually by the use of resistances.

In the form shown in Figure 4, the tunnel is constructed of a pair of half-cylindrical members 24 and 25. These half sections are hinged together, and the internal wall and also preferably the external wall, are highly polished to reflect the radiant heat rays.

In the form illustrated in Figure 5 the tunnel casing is rectangular, but a different arrangement of heaters is shown in the form of small coils 26 equally spaced from each other outside of the cylindrical heat-distributing screen 18'. The particular form of the heating element may be varied as also may the form of the heat tunnel, but it will be readily appreciated that by the use of radiant heat elements heat can be applied to the rubber-covered wire in a graduated manner, intensifying the heat as the wire travels onward until the maximum temperature has been reached and this can be sustained for a desired period.

The temperature within the tunnel may be enhanced by an atmospheric condition, if such is desirable. In the form herein shown the heating tunnel is open at the ends to atmosphere. It will be readily understood that the ends may be closed around the rubber-covered wire to enable an air pressure to be created therein, or a vacuum may be arranged if desired. It will be understood that the transmission of heat by this method is not dependent upon conduction or convection.

The rubber-covered vulcanized wire passing from the vulcanizing tunnel, travels around the tension rollers 27 arranged within a casing mounted on a standard 28 and passes through a cooling casing 29, also mounted on the standard 28, the cooling being effected by a spray or by cold air jets.

The wire passes through a final drying element 30 and is wound on a drum 31 mounted in the capstan brackets 32 supported by the standard 28.

It will be understood that this process is continuous through the entire length of any coil of wire.

In the form of the device illustrated in Figures 6 and 7, a plurality of rollers 33 arranged transversely of the vulcanizing casing, are spaced at equal distances apart and support the upper reach of an endless belt 34 formed of fine wire mesh. Between the rollers and the bottom side of the vulcanizing casing are arranged a series of electric heating elements 35 which are of any desirable construction suitable for the purpose of directing heat waves upwardly through the screen belt travelling over the rollers to have a vulcanizing effect upon a rubber strip carried by said belt.

Another set of heaters 36 is arranged a suitable distance above the belt 34 and a fine wire screen 37 is disposed between the latter heater and the upper surface of the rubber strip carried on the belt. The radiant heat emanating from the upper and lower heaters is diffused by the interposed screening in such a way that there is a uniform distribution of heat units to the rubber which may be a flat strip taken directly from a calender 38 as shown in Figure 8, or it may be a tube produced by a tubing machine, which tube may be cured flat as illustrated in Figure 6, or it may be inflated, or partly so.

If the tube is inflated a readjustment or arrangement of differing forms of heaters from that shown may be required, but the principal element is the arrangement of controllable electric heaters and screens within a tunnel and directing heat rays in regulated quantity to effect the vulcanization of the goods being employed.

What I claim as my invention is:—

1. In a continuous vulcanizing machine the combination with a tubular chamber through which the vulcanizable material is adapted to be fed in a continuous manner, of a plurality of radiant heating elements spaced longitudinally within said tubular chamber, and means disposed in the space between said radiant heating elemnts for supporting said material in a position uniformly relative to said heaters.

2. In a means for continuously vulcanizing rubber articles, the combination with a tubular chamber through which the material to be vulcanized is adapted to be fed in strip form, of a plurality of radiant heating elements spaced longitudinally within said chamber and directing radiant heat rays to effect the heating of the strip, means for supporting the strip in a position uniformly relative to said heaters, and fine wire mesh screens interposed between the heaters and the rubber material.

3. In a means for continuous vulcanization of rubber goods, the combination with a tubular casing, through which the material to be vulcanized is adapted to be fed, and means within said tubular casing for supporting the fed material in its passage therethrough, of cylindrical lengths of fine wire screening arranged between said supporting means to encircle the fed material, and radiant heater coils arranged exterior to said cylindrical screens directing radiant heat through and against said screens, said screens acting to absorb and diffuse the radiant heat on the inward side in close proximity to the fed material.

4. In a means for continuous vulcanization of rubber goods, the combination with a rubber strip to be vulcanized, of a tunnel casing through which the strip is to be advanced having highly burnished reflective walls for encircling the rubber strip, means for supporting the formed rubber strip substantially centrally within the casing, radiant heat elements disposed at intervals within said casing and directing radiant heat to the rubber strip and to the casing walls to be reflected inwardly therefrom, and means interposed between the radiant heat elements and the central region of the highly burnished tunnel casing for effecting the substantially uniform inward diffusion of the direct and reflected radiant heat rays.

5. In a means for continuous vulcanization of rubber goods, the combination of an elongated casing of tubular form having highly burnished surfaces, fine wire mesh screen disposed in tubular form supported in spaced relation to the highly burnished casing walls and forming a tunnel through which the material to be vulcanized is advanced, means for supporting the said material in substantially centralized relation to the wire screen tunnel, and electric heating coils disposed between the wire screen tunnel and the highly burnished casing wall and directing radiant heat directly onto the screen tunnel and outwardly against the burnished casing wall, said burnished casing wall serving to redirect the outward rays inwardly toward the screen tunnel.

6. In a means for continuous vulcanization of rubber articles, a tubular metal casing having highly burnished walls arranged to receive the rubber article to be vulcanized, an endless belt of fine wire screening operating within said reflector casing to receive and carry the rubber article through said vulcanized casing, radiant heat-dispersing elements arranged at intervals throughout the length of said reflector casing and directing radiant heat waves downwardly toward the rubber strip and upwardly against the underside of said endless belt, said wire belt acting to effectively diffuse the upwardly directed rays, and means for diffusing the downwardly directed heat rays.

7. In a means for continuous vulcanization of a rubber strip, a tubular casing of a highly polished metal having hinged sections adapted to be raised to disclose the material therein and through which a strip of rubber is to be advanced, radiant heat elements arranged within said tubular casing throughout its length, means intercepting both direct heat rays from said elements and reflected heat rays from the highly polished metal of said casing for diffusing radiant heat rays toward the central region of the casing, and means for supporting the strip centrally within said casing within said diffusing means.

8. A tunnel type of continuous vulcanizer in which a strip of vulcanizable material is advanced through the tunnel for heat treatment, characterized in the provision within the tunnel of a tubular wire mesh screen element acting as a radiant heat diffuser, and an electric heating element coiled spirally around said tubular wire mesh screen element and applying radiant heat rays thereto.

9. A vulcanizer as claimed in the preceding claim in which said tubular wire mesh screen element is of a black finish whereby it absorbs the maximum heat value from the said rays to diffuse the same inwardly.

10. In a vulcanizer for continuous strips, an elongated casing having a highly burnished cylindrical inner surface, electric heating coils mounted in a cylindrical open formation concentrically of said burnished cylindrical surface and directing radiant heat rays inwardly and also outwardly against said burnished cylindrical surface to be reflected therefrom back to the axis, means for directing a strip of material to be vulcanized axially through said electric heating coils, and a cylindrical heat-diffusing member mounted concentrically within said heating coils.

LEWIS J. CLAYTON.